United States Patent Office 3,356,468
Patented Dec. 5, 1967

3,356,468
WELDED CONDUCTORS TO CARBON
AND GRAPHITE CLOTH
Henry J. Pinter, Alliance, Ohio, assignor of twenty-five percent to George E. Schick
No Drawing. Filed Nov. 9, 1964, Ser. No. 409,976
4 Claims. (Cl. 29—195)

ABSTRACT OF THE DISCLOSURE

A carbon of graphite product is formed by positioning a conductor formed of one of carbon, silver or copper silver alloys adjacent carbon or graphite cloth and weld depositing an alloy forming a welded bond therebetween. The bonding alloy consists of at least essentially 0.2 percent vanadium and the remainder essentially silver with there always being at least a minute quantity of said silver, or at least essentially 9.09 percent vanadium and the remainder essentially copper with there always being at least a minute quantity of said copper, or at least essentially 0.125 percent titanium and the remainder essentially silver with there always being at least a minute quantity of said silver.

---

My invention relates to alloys for welding conductors to carbon and graphite cloth, and more specifically, to alloys for welding conductors of copper, silver, and copper silver alloys, to carbon and graphite cloth. Even more specifically, my invention relates to alloys which may be melted in a conventional inert gas atmosphere and will provide a sound welded electrically conducting bond between copper, silver, or copper silver alloy conductors and carbon or graphite cloth.

A woven cloth formed of carbon or graphite has recently been developed which has the general appearance of conventional cloth formed of synthetic fibers. All uses of this carbon or graphite cloth are not yet known, but one possible use being developed is for heating grids in place of the usual metal coils or strips.

In this heating grid use, the carbon or graphite cloth will become extremely hot merely by passing electrical power therethrough of relatively low magnitude. Furthermore, the power consumption to produce such heat is low as compared to the conventional metal coils or strips and, therefore, this cloth can be used to provide electric heaters which may be operated at much lower costs than has been heretofore possible.

In order to resistance heat this carbon or graphite cloth, it is necessary to pass electrical power through the same, and this requires the attachment of electrical conductors to it. Prior to my present invention, to my knowledge, this has been done by the use of various forms of clamping means, since no alloys have been known which can be used for successfully welding the conductors to the carbon or graphite cloth.

It is, therefore, a general object of the present invention to provide alloys for welding conductors to carbon and graphite cloth which will provide a sound electrically conducting bond therebetween.

It is a primary object of the present invention to provide alloys for welding conductors to carbon and graphite cloth with which the conductors may be formed of copper, silver or copper silver alloys.

It is a further object of the present invention to provide alloys for welding conductors to carbon and graphite cloth with which by varying the amounts of the various metals in the alloys, the temperature characteristics and electrical conductivity characteristics may be varied as desired.

Finally, it is an object of the present invention to provide alloys for welding conductors to carbon and graphite cloth which satisfy all of the above objects, yet may be formed and used with conventional inert gas shielded equipment.

These and other objects are accomplished by the alloys, products, methods and procedures comprising the present invention, preferred embodiments of which—illustrative of the best mode in which applicant has contemplated applying the principles—are set forth in the following description and which are particularly and distinctly pointed out and set forth in hte appended claims forming a part hereof.

In general terms, the improvements of the present invention may be stated as including alloys for welding conductors to carbon and graphite cloth, new products incorporating such alloys with conductors and carbon and graphite cloth, and new methods for using such alloys to weld conductors to carbon and graphite cloth and thereby produce the new products.

According to the present invention, my new alloys are formed by mix melting in an inert atmosphere a first alloying element consisting of 1 part of vanadium and a second alloying element consisting of one of from a minute quantity to substantially 500 parts of silver or from a minute quantity to substantially 10 parts of copper, or a first alloying element consisting of 1 part of titanium and a second alloying element consisting of from a minute quantity to substantially 800 parts of silver. For instance, the mix melt forming of the new alloys may be accomplished by use of conventional arc welding equipment having argon or helium inert gas shielding.

Stated in another way, my new bonding alloys consist of at least essentially 0.2 percent vanadium and the remainder essentially silver with there always being at least a minute quantity of said silver, or at least essentially 9.09 percent vanadium and the remainder essentially copper with there always being at least a minute quantity of said copper, or at least essentially 0.125 percent titanium and the remainder essentially silver with there always being at least a minute quantity of said silver. All of said percentages are, of course, by weight.

The new alloys may be formed in bar or stick form for convenience in later depositing on the carbon or graphite cloth and conductors.

After the alloys have been prepared according to the foregoing, a conductor formed of one of copper, silver, or copper silver alloys is positioned adjacent the carbon or graphite cloth and one of the alloys is weld deposited, preferably using the same welding equipment, and particularly in the inert atmosphere, to thereby weld the conductor to the cloth. The thusly formed welded joint will provide a sound bond between the conductor and cloth having temperature and electrical conductivity characteristics as desired depending on the particular quantities of the alloying elements used in the particular alloy within the specified limits.

If higher temperature characteristics are desired, the quantities of copper or silver are reduced to thereby increase the percentages of vanadium or titanium and, in turn, raise the temperature characteristics. The greater the percentages of vanadium or titanium, however, the lower will be the electrical conductivity of the alloys, and, therefore, the welded point or bond.

Raising the percentages of copper or silver in the alloy will, of course, increase the electrical conductivity. Thus, by increasing or decreasing the percentages of vanadium or titanium and copper or silver in the alloys within the ranges specified, a balance between temperature characteristics and electrical conductivity characteristics may be arrived at to satisfy the application of the particular carbon or graphite cloth product.

It has been found that if the vanadium or titanium is eliminated from the alloys or reduced below the limits specified, no wetting of the alloys on the carbon cloth will occur when it is attempted to weld deposit the alloys for forming the bonds between the cloth and conductors. For this reason, the vanadium or titanium must be maintained within the limits specified.

On the other hand, if the copper or silver is eliminated from the alloys, there will be extremely low electrical conductivity so as to make the final product of little use.

Thus, according to the present invention, particular alloys are provided for welding copper, silver, or copper silver alloy conductors to carbon or graphite cloth with which a sound bond is accomplished using conventional welding equipment. Furthermore, by selectively varying the various alloying elements forming the alloys within specified limits, a balance between desired temperature and electrical conductivity characteristics may be provided to form useful carbon or graphite cloth products.

It should be understood that in the foregoing and in the following claims, where the conductors to be welded to the carbon or graphite cloth are specified as "copper," "silver," or "copper silver alloys," it is not intended to limit such conductors to pure copper and/or silver, but rather any conductors including copper and/or silver may be used.

In the foregoing description, certain terms have been used for brevity, clearness and understanding, but no unnecessary limitations are to be implied therefrom, because such words are used for descriptive purposes herein and are intended to be broadly construed.

Moreover, the embodiments of the alloys, products, methods and procedures described herein are by way of example and the scope of the present invention is not limited, except where specifically set forth, to exact details of construction and procedure described.

Having now described the invention, and the advantageous new and useful results obtained thereby, the new and useful alloys, products, methods and procedures, and reasonable mechanical equivalents thereof obvious to those skilled in the art are set forth in the appended claims.

I claim:

1. Carbon and graphite cloth products including cloth formed of one of carbon and graphite; a conductor formed of a metal selected from the group of copper, silver and copper silver alloys; and an alloy forming a welded bond between the cloth and conductor selected from the group consisting of at least essentially 0.2 percent vanadium and the remainder essentially silver with there always being at least a minute quantity of said silver, at least essentially 9.09 percent vanadium and the remainder essentially copper with there always being at least a minute quantity of said copper, and at least essentially 0.125 percent titanium and the remainder essentially silver with there always being at least a minute quantity of said silver.

2. Carbon and graphite cloth products including cloth formed of one of carbon and graphite; a conductor formed of a metal selected from the group of copper, silver and copper silver alloys; and an alloy forming a welded bond between the cloth and conductor consisting of at least essentially 0.2 percent vanadium and the remainder essentially silver with there always being at least a minute quantity of said silver.

3. Carbon and graphite cloth products including cloth formed of one of carbon and graphite; a conductor formed of a metal selected from the group of copper, silver and copper silver alloys; and an alloy forming a welded bond between the cloth and conductor consisting of at least essentially 9.09 percent vanadium and the remainder essentially copper with there always being at least a minute quantity of said copper.

4. Carbon and graphite cloth products including cloth formed of one of carbon and graphite; a conductor formed of a metal selected from the group of copper, silver and copper silver alloys; and an alloy forming a welded bond between the cloth and conductor consisting of at least essentially 0.125 percent titanium and the remainder essentially silver with there always being at least a minute quantity of said silver.

References Cited

UNITED STATES PATENTS

| | | | |
|---|---|---|---|
| 1,304,844 | 5/1919 | Barnes | 29—199 |
| 2,282,098 | 5/1942 | Taylor | 29—472.9 |
| 2,490,776 | 12/1949 | Braunsdorf | 29—472.7 |
| 3,065,532 | 11/1962 | Sachse | 29—195 |
| 3,144,370 | 8/1964 | Bennett | 29—472.9 |

OTHER REFERENCES

"Constitution of Binary Alloys," published 1958, Dr. Hansen, McGraw-Hill Book Company, pp. 58–60.

HYLAND BIZOT, *Primary Examiner.*